H. W. CLAPP.
Sink-Trap.

No. 199,145. Patented Jan. 15, 1878.

Witnesses
Charles O. Foss
Frank A. Merrill

Inventor
Henry W. Clapp
by his attorney
Chas C. Dund

UNITED STATES PATENT OFFICE.

HENRY W. CLAPP, OF CONCORD, NEW HAMPSHIRE.

IMPROVEMENT IN SINK-TRAPS.

Specification forming part of Letters Patent No. 199,145, dated January 15, 1878; application filed November 19, 1877.

*To all whom it may concern:*

Be it known that I, HENRY W. CLAPP, of Concord, in the county of Merrimack, State of New Hampshire, have invented a new and useful Improvement in Traps for Sinks and Bowls, which improvement is fully set forth in the following specification and accompanying drawing, in which—

Figure 1:
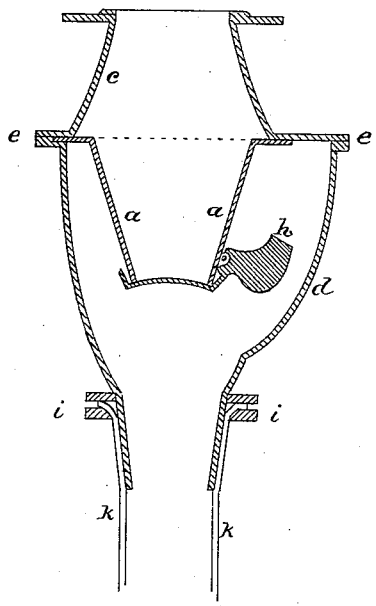
Figure 2:
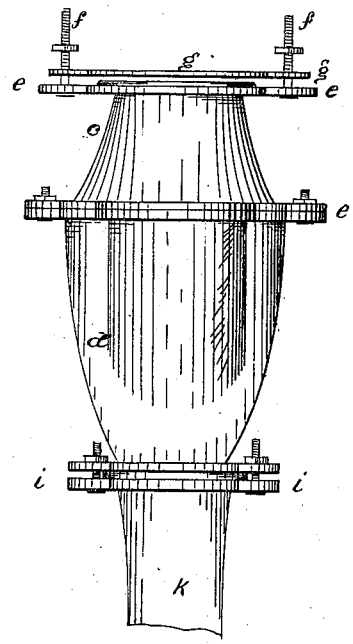

Figure 1 is a sectional view thereof, and Fig. 2 is a side elevation.

At $a$ $a$, Fig. 1, is represented a section of a trap for which Letters Patent dated April 17, 1877, were granted unto me, the operation whereof is more fully explained in the specification of said patent.

My improvement consists in providing said trap with a tight metallic casing, so arranged that it can be readily applied to sinks and bowls.

My casing consists of two portions, $c$ $c$ and $d$ $d$. The upper portion, $c$ $c$, is circular in horizontal section, but larger at the lower than at the upper end, as shown in Fig. 1, and is provided with flanges $e$ $e$, both at the upper and lower end. The upper flanges are provided with ears, through which the screw-bolts $f$ $f$, Fig. 2, pass, having nuts whereby my trap is attached to the ordinary form of sink in use. At $g$ $g$ is represented a rubber, leather, or other suitable ring or gasket interposed between my casing and the flange on the sink, making the joint tight when the case is screwed into its place. The lower flange is also provided with ears, bolts, and nuts, and also with a projection to cover the chamber in the lower casing, hereinafter described.

The lower portion of my casing, $d$, has a chamber upon one side, in which the counter-weight plays as the valve opens and closes. The upper end of this portion of the case is provided with a flange, which is rabbeted to receive the trap $a$, and provided with ears and bolts, by which it is attached to the upper portion of the case above described. The joint is made tight by red lead or other suitable packing.

The lower end of this case terminates in a conical pipe, around which collars are fitted, as shown at $i$ $i$, which collars are provided with ears and bolts, as shown. The upper of these collars is cast on the case. The lower one is loose, and the inside upper edge thereof beveled, as shown in Fig. 1.

K represents a lead pipe, slightly enlarged at its upper end to receive the conical casing, and the extreme upper end is spread out all around, so as to be securely held between the upper and lower collar when the nuts are tightened.

By these means I obtain a serviceable trap for sinks and bowls, which permits fluids to pass readily, and arrests objectionable matter, which is not liable to freeze, and not be injured in case it does freeze, and can be easily applied and easily removed in case it needs repairs.

I claim as my invention and desire to secure by Letters Patent—

The combination of the trap $a$, counter-weight $h$, casing $c$ $c$ and $d$ $d$, flanges $e$ $e$, and provided with the counter-weight chamber, and collars $i$ $i$, arranged and operating as and for the purposes set forth.

Concord, New Hampshire, November 10, 1877.

HENRY W. CLAPP.

Witnesses:
 CHARLES O. FOSS,
 FRANK A. MERRILL.